United States Patent
von Montgelas et al.

[11] Patent Number: 6,004,651
[45] Date of Patent: Dec. 21, 1999

[54] COMPOSITE SLAB MADE OF PLASTIC AND METHOD FOR ITS MANUFACTURE

[76] Inventors: Max Joseph Graf von Montgelas, Frontenhausener Str. 1; Udo Finke, Am Hirschgarten 15, both of D-84175 Gerzen; Karl Harald Erlinghagen, Unterruesselbach, Kalmaecker 8, D-91338 Igensdorf, all of Germany

[21] Appl. No.: 09/009,078

[22] Filed: Jan. 20, 1998

[30] Foreign Application Priority Data

Jan. 22, 1997 [EP] European Pat. Off. ............... 97100947
Jul. 17, 1997 [DE] Germany ........................ 297 12 684 U

[51] Int. Cl.⁶ ............................... B32B 5/12; B29C 47/00
[52] U.S. Cl. .................... 428/113; 428/182; 428/184; 428/212; 428/311.11; 428/311.51; 428/515; 428/516; 156/244.15; 264/177.2; 264/211.12; 264/211.14
[58] Field of Search .................... 428/182, 184, 428/311.11, 311.51, 174, 113, 212, 515, 516; 264/176.1, 177.2, 209.7, 211.12, 211.14, 286; 156/205, 244.11, 244.15

[56] References Cited

U.S. PATENT DOCUMENTS

2,221,309  11/1940  Gazelle .................................. 428/182
3,640,796  2/1972  Cotelle .................................. 52/309
4,216,268  8/1980  Stillman .............................. 428/424.8

*Primary Examiner*—Donald Loney
*Attorney, Agent, or Firm*—Peter E. Rosden

[57] ABSTRACT

A composite slab made of plastic, especially polypropylene, for construction purposes and packing purposes for example is described, said slab according to a preferred embodiment comprising a plurality of layers, each of which consists of a composite that is extruded in a plurality of layers and of which two plane layers and the others are profiled, namely layers that have a corrugated profile with peak lines that are located in a plane, with these layers being welded together along the peak lines on one side of the profiled layer and/or at the intersections of the peak lines of adjacent profiled layers. Layers consisting of a plane slab can be provided between the profiled layers. The composite extruded in several layers comprises two outer layers and a middle layer made of polymers from the same material group, whose middle layer consists of a highly crystalline polymer with incorporated stretch-resistant fibers, whose melting point is at least 15° C. higher than the melting points of the polymers of the outer layers and whose modulus of elasticity is at least 10% lower than the moduli of elasticity of the polymers of the outer layers. Several variations as well as the manufacturing method for the composite slabs are described (FIG. 4).

16 Claims, 7 Drawing Sheets

COMPOSITE SLAB MADE OF PLASTIC AND METHOD FOR ITS MANUFACTURE

The invention relates to a composite slab made of plastic, especially for construction purposes and packing purposes, with at least one layer of a composite comprising two outer layers and a middle layer made of polymers, preferably aliphatic polymers, from the same material group, and a method for manufacturing a multilayer composite slab of this type.

The area of application of the composite slab, especially in its multilayer form, is primarily its use as formwork for concrete construction, but it can also be used advantageously as roofing material, insulating slabs, scaffolding board, external facing, flooring, and ceiling slabs. Another preferred area of application consists of packing cartons and the like.

The invention relates especially to a multilayer composite slab whose individual layers are formed by multilayer basic composite slabs with a basic structure, but also includes basic composite slabs that can be used for purposes other than making multilayer composite slabs, for example as rigid foil-type packing or construction material. The following slab thicknesses are mentioned as preferred examples for the sake of illustration: basic concrete slab 1.5 mm, multilayer composite slab up to 50 mm, 21 mm for example.

In practice, wood continues to be the material predominantly used for formwork. It is also known to apply a cover layer made of a plastic that forms the surface of the form to formwork made of wood or metal. The use of specially treated, especially smooth outer layers or outer layers that adhere to concrete is also known to be applied to formwork core layers not made of wood or metal (DE-OS 31 17 861), and formwork slabs are also known that are made of plastic scrap and plastic granulate. Formwork is also known that is made of a lattice, especially a space lattice, over which a film is placed (DE-OS 36 01 884, DE-PS 37 23 676). Finally, formwork panels made of slabs are also known (DE-OS 38 04 506), said panels being composed of plastic and provided on the back with stiffening elements, especially ribs or strips, and can contain cavities filled with foam.

Composite slabs of the type recited at the outset are known from DENS 42 01 319 for example.

Generally speaking, these various solutions have not prevailed. Wooden formwork is still preferred for practical applications, since it is still the most advantageous solution as far as flexural strength, abrasion resistance, and point load resistance as well as additional properties such as nailability, etc. and also as regards price, although it is by no means optimum because of its weight, non-reusability, and problems with disposal.

On the other hand, formwork made of solid plastic slabs is unaffordable for practical applications.

However, even in the case of plastic slabs used in construction for other purposes, there is generally a discrepancy between the strength properties and the desired surface characteristics.

The composite slab according to the invention, initially only a single-layer slab, is characterized by the fact that the composite is a composite that is extruded in several layers and whose middle layer consists of a highly crystalline polymer with incorporated stretch-resistant fibers, especially steel, glass, or carbon fibers, whose melting point is at least 15° and preferably less than 30° higher than the melting points of the polymers of the outer layers, and whose modulus of elasticity, depending on the technical requirement, is at least 10% lower than the modulus of elasticity of the polymers in the outer layers. The at least three slab layers are held together with very high adhesion by virtue of the fact that they are extruded from the same material group in several layers and are held together with very high adhesion, a technique that is known of itself for flexible films; the middle layer provides the mechanical strength and the outer layers, as a result of choosing suitably modified varieties of the polymer, are easy to weld and relatively soft, so that the slab is resistant to impacts and any holes made by nails will close again, or relatively hard, so that when it is used as a formwork surface this layer is abrasion-resistant and the concrete separates easily after setting, even without using formwork oil. The lower modulus of elasticity produces a damping effect when the slab is subjected to impact stress and low temperatures. Polyolefins, especially polypropylenes, are preferably used as material for the composite slab. The use of these materials in formwork construction is known of itself (DE-OS 42 01 319). They prove to be especially advantageous within the scope of the invention when, other, usually more expensive, plastics are used to confer special properties; for example, mention should be made of linear polyesters, polyethylene terephthalate, and polybutylene terephthalate, which can also be used in combination, have improved resistance even at extreme temperatures, and can also be made transparent, but are more expensive than polypropylene. Others that can be mentioned include polyethylene and ketone plastics including polyetherketone, but these also can be used only in exceptional cases because of their high price.

The stretch-resistant fibers of the middle layer are preferably fibers that are coupled chemically with the polymer, in other words, by chemical adhesion promotion.

This single-layer composite slab is suitable as a basic composite slab used to make a multilayer composite slab. According to the invention, the latter comprises at least two layers, each of which is individually composed of a basic composite slab; when there are two layers, one of the layers is a plane layer and the other is a shaped layer that has a corrugated shape with peak lines that lie in a plane, said layers being welded to one another along the peak lines on one side of the shaped layer. The plane layer, in other words a composite slab according to claim 1, serves as the outer layer and is connected at its back with the corrugated profile which in particular can be a sawtooth or zigzag profile. On its side that is joined to the shaped layer, the plane layer has an outer layer that can be welded readily, and the same is true of the shaped layer on its side that joins the plane layer. The composite slab that has only two layers can be used for example at locations where the formwork is intended to be in the shape of an arc or a segment of a cylinder. The corrugated profile is preferably a zigzag profile whose peak lines consist of edges parallel to one another, between which edges flanks are located whose outer sides meet at an angle between 30° and 60° at the peak line. The shaped layer preferably has a volume fullness ratio of 30% to 50%.

The multilayer composite slab according to the invention, according to a preferred embodiment, consists of more than two, especially six layers, of which the two outer layers are three-layer plane composite slabs and the four layers located between are shaped composite slabs, with these shaped layers being welded directly to one another and each of these layers having peak lines parallel to one another, and the peak lines of adjacent shaped layers assuming an angle relative to one another of more than 20°, preferably a right angle. Adjacent shaped layers therefore touch only at points, with a point density of nine contact points per square centimeter prevailing according to one preferred set of dimensions. When this stack of plane and shaped slabs is welded together, a relatively rigid composite results, but one that is also elastic to a predetermined degree, with the material consumption and weight of this slab being relatively low. Weight savings of at least 50% can be achieved over an equivalent wooden slab. The point contact of the adjacent shaped slabs permits optimum welded connections, produced by heat and pressure at the contact points. It is possible to fill the wave troughs of the shaped layer or layers with foam on both sides, so that maintaining the temperature until the welding process is completed is facilitated initially during the welding process and the advantage is later achieved that the slab is protected from water penetration, which increases its weight and could damage the slab when it freezes.

The multilayer slab thus assembled therefore has the special feature of a grid of spot welds at which the peak lines of adjacent shaped layers are welded together. Depending on the application and production facilities, the design of the composite slabs can be varied, with only two shaped layers and corrugated outer surfaces for example, or with a plurality of shaped layers and plain outer layers, as well as with different corrugation pitches and different layer thicknesses, so that the density of the spot welds is varied as well. The composite slabs can also be made with a certain degree of flexibility, for packing purposes for example, and can be provided with bending and cutting lines to form a carton blank.

However, a very small number of spot welds is produced relative to the area, so that the strength of the composite slab, in other words the cohesion of the layers, suffers. The welding possibilities as well as the strength aspects can make a variation on the multilayer composite slab appear advantageous, so that an intermediate slab is inserted between at least two adjacent shaped layers, said slab being welded to the peak lines of the shaped layers abutting it. Linear welding can produce a stronger cohesion of the welds than spot welding alone, whenever the same depth of penetration is achieved. An effort to produce the same depth of penetration only makes sense of course when this is possible without a pressure being applied such that the multilayer structure would be damaged as a result. The intermediate slabs can be inserted between all of the shaped layers, between some of the shaped layers, or as individual intermediate slabs between two of the shaped layers. The shaped layers are therefore welded to this intermediate slab not only spotwise but also along lines, which requires a modified welding technology that may be simpler if the equipment is available and influences the strength and rigidity properties. The insertion of the intermediate slab is especially significant when the density of the spot welds would be very low without the intermediate slab because of limited steepness or small amplitude of the corrugations, for example with a relatively flat zigzag, which can be the case for example in flexible composite slabs.

Especially in the case of multilayer composite slabs for packing purposes, the provision of bending and cutting lines as well as the gluing and welding of bending hinge strips, for example to make packing and moving cartons can be advantageous, especially in the case of multilayer composite slabs that lack the intermediate slab described above and are flexible to some degree. For smaller boxes, thinner composite slabs are preferred, for example those with only a single shaped layer. Suitably produced packing units are insensitive to water and can be readily reused.

The invention also includes a method for making multilayer composite slabs, with a corresponding number of plane slabs extruded in multiple layers being reshaped by deep drawing into shaped slabs that have a corrugated profile in the first step. For economic reasons, it is preferable initially to produce and stock plane as well as shaped slabs in certain quantities and then, in a subsequent workstep, to bring the slabs out of storage and connect them by welding. For connection, the layers or at least their outer layers to be welded are brought to a temperature below the melting points of the middle layer and outer layers of the layers, and are then brought to this heated state with their edges or points touching and are pressed against one another. Preferably the connections are produced at one time, only in a single connecting plane between two layers, for example the layers are supplied individually and welded to the composite already formed in such fashion that during each welding process, only a single intermediate layer connection is produced so that the welding temperature can be better controlled at the intended connecting points.

The slab can also be produced in only a single workstep, however.

The shaped layers are preferably produced from the plane slabs by deep drawing with the aid of an embossing calender whose nip the plane slab enters and from whose nip the shaped slab emerges. It is also possible to deep-draw the slab as a unit in a male-female forging die. However, a much higher compressive force is necessary for this purpose. Shaping is advantageously performed in such fashion that a zigzag profile is produced with peak areas that are slightly weaker as far as thickness is concerned, along which the outer layer can then be heated and melted more easily, while the slightly thicker flanks have not yet begun to soften. The material temperature that prevails during deep drawing, depending on the material, lies in the range from 65° C. to 260° C. in the case of the currently preferred polymers. Long-wave infrared radiation is especially suitable for applying the heat. Short-wave infrared radiation is equally effective as far as the heating effect is concerned, but requires greater expenditures for equipment and expenses. To increase the surface pressure at the contact point, and therefore at the connecting points during mutual penetration into the respective outer layers of the adjacent layers, the zigzag profile can be chosen such that the angle in the peak area is even more acute than the slope angle of the flanks with respect to one another, in other words in the shape of a dual hump.

Further details, advantages, and improvements on the invention will be seen from the following description of preferred embodiments with reference to the drawing.

Figure 1:
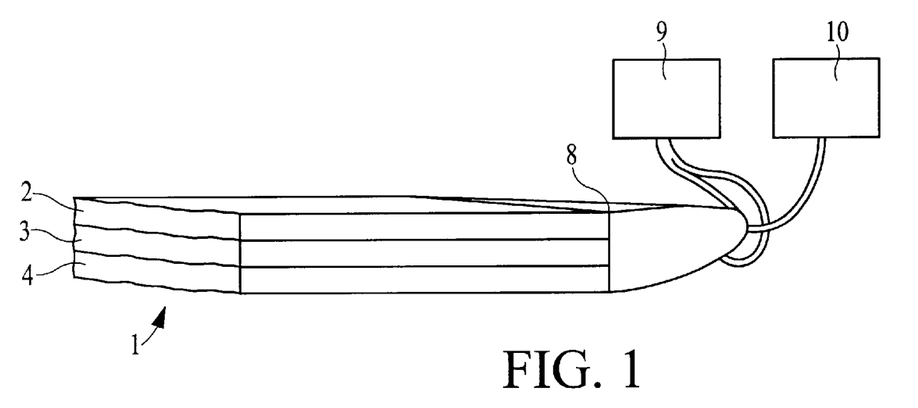
FIG. 1 is a schematic perspective view of a single-layer plane composite slab, as well as an indication of the installation required for its manufacture.

FIG. 1 shows a plane composite slab, hereinbelow referred to as basic slab 1, made of three layers, namely an outer layer 2, a middle layer 3, and another outer layer 4. Basic slab 1 is shown emerging from a triple extrusion nozzle 8, supplied from two raw material tanks 9 and 10, with tank 9 supplying the material for outer layers 2 and 4 and tank 10 supplying the material for middle layer 3.

The three layers 2, 3, and 4 of basic slab 1 are made of polypropylenes, i.e. outer layers 2 and 4 are made of a soft polypropylene with a melting point of about 130° C. and middle layer 3 is made of a mechanically highly stretch-resistant polypropylene, with which glass fibers running lengthwise are chemically coupled, with a melting point of about 165° C. The difference in melting point of about 35° C. is made relatively large but if possible should not be less than 30° and is practically useless in terms of the invention if it is below 15° C.

In basic slab 1 according to FIG. 1, the materials of outer layers 2 and 4 are the same. However, there is also a need for basic slabs I with different materials for outer layers 2 and 4. By using copolymer components, the properties of the plastic materials can be adjusted in a manner known of itself, i.e. outer layer 2 can be very hard, impact-resistant, and temperature-resistant up to −20° C. for example, while outer layer 4 remains a soft, easily welded layer. For applications other than formwork, for example as flooring, it may be necessary to make outer layer 2 out of a material with a high static friction value, while when it is used as a wall slab, it can be made from a material that has certain flow properties, and holes such as nail holes close again after the object producing the hole is removed. With such different material properties for outer layers 2 and 4, a third raw material tank is required for one of the outer layers.

Layers 2, 3, and 4 are made of materials from the same material group, namely polypropylenes, with the bond between them being very strong. Middle layer 3 provides the required mechanical strength and outer layers 2 and 4 provide the desired contact properties.

Figure 2:
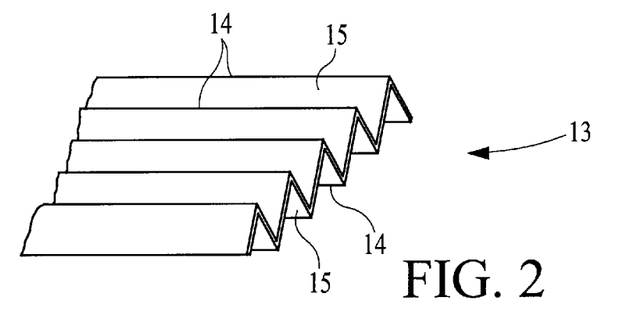
FIG. 2 shows on a reduced scale and in a perspective view, a shaped slab made from the plane composite slab in FIG. 1 by deep drawing.

To produce a multilayer composite slab, suitable shapes of basic slab 1 are provided with a corrugated profile by deep drawing, as shown in FIG. 2. For this purpose, an embossing calender is preferably employed, whose shaped rolls emboss basic slab 1 and lie in the direction transverse to the direction of travel, which is performed [sic] in a given temperature range which in the case of polypropylene lies on the order of about 120° C., and during cooling from a previous, considerably higher temperature, preferably about 170° C. This previous temperature can for example be the temperature during extrusion, so that the embossing calender is located a short distance downstream from the extruding nozzles and after controlled cooling. For economic reasons, however, it usually appears to be more advantageous initially to store the extruded basic slabs for a time, to reheat them for later deep drawing, and then to cool them again to about 120° C., in order to draw slabs during deep drawing or, following this cooling, to "cold stretch" them. The processes involved in cold drawing are known of themselves and are used for films in particular. After calendering, the shaped slabs can advantageously be allowed to cool and can be stored until they are processed further.

Shaped slabs are mostly made in the form of basic slabs 1 with identical outer layers 2 and 4 that melt readily. If the basic slab has a thickness of 1.5 mm for example, the shaped slab will have a thickness of only 0.75 mm or so. It has peak lines 14 and flanks 15 on both sides. The strict zigzag shape shown in FIG. 2 with plane flanks 15 and sharp edges as peak lines 14 is advantageous but is by no means the only form of corrugation possible. For example, a sinusoidal shape is also possible as a corrugation shape, but because of the relatively large contact surfaces it cannot be welded as easily, or the stepped slab profiles described below can be used.

Figure 3:
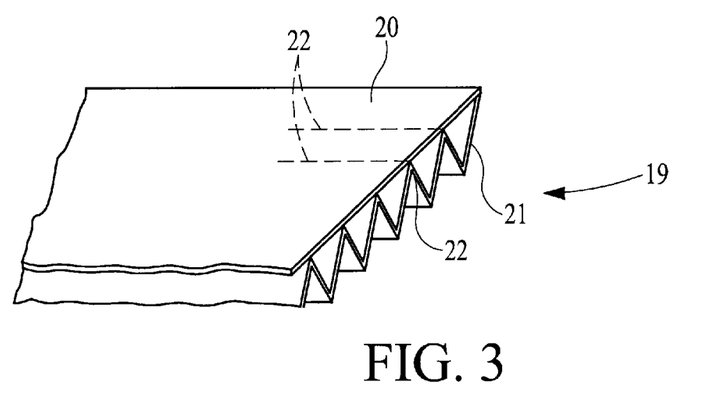
FIG. 3 is a perspective view of a corner of a two-layer composite slab.

Shaped slab 13 serves as one layer in a multilayer composite slab. FIG. 3 shows a very simple form of such a composite slab, marked 19. It is made of a first plane layer 20, formed by a basic slab 1, and a second shaped layer 21, formed by a shaped slab 13. Layers 20 and 21 are welded together along connecting lines 22. The connecting lines coincide with the peak lines 14 of the shaped slab. Welding is performed in such fashion that slabs 1 and 13 forming the layers are heated by irradiation with long-wave infrared light on the slab sides facing one another to a temperature that is between the melting point of outer layers 2 and 4 in contact with one another and the melting point of the two middle layers 3. Therefore, the outer layers are at least softened or melted completely, whereupon the slabs are pressed together. This is advantageously accomplished by passing them through a press calender with a precisely-set roll nip, whereupon outer layers 2 and 4 touching one another flow into each other under the influence of pressure and heat, preferably until the two middle layers 3 touch one another.

Figure 4:
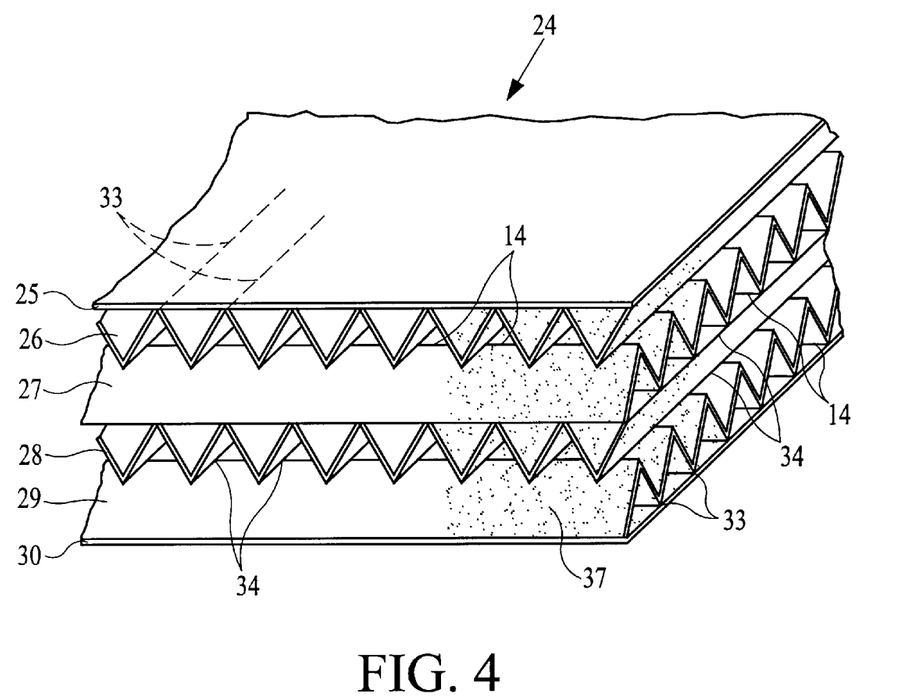
FIG. 4 is a perspective view of one corner of a six-layer composite slab.

The two-layer composite slab 19 according to FIG. 3 is advantageous for construction purposes only for special applications, for example formwork in the shape of an arc or supported at the back. The six-layer composite slab 24 according to FIG. 4 can be used universally, especially as formwork slabs. Its six layers are as follows: an external first layer 25, composed of a plane basic slab corresponding to slab 1; a second layer 26 consisting of a shaped slab corresponding to shaped slab 13 in FIG. 2; a third layer 27 likewise composed of a shaped slab corresponding to slab 13, but rotated through 90° in such fashion that lower peak lines 14 of layer 26 and upper peak lines 14 of layer 27 intersect at right angles; a fourth layer 28 which in turn consists of a shaped slab 13, oriented in the same way as the slab in second layer 26; a fifth layer 29 resembling third layer 27; and a sixth layer 30, consisting of a plane basic slab 1. Layers 25 and 30 are the outer slabs of composite slab 24. In FIG. 4, the slabs in layers 26 and 28, like the slabs in layers 27 and 29, are shown approximately in the same phase, in other words with the peaks located directly above or below one another. This is not necessary in itself, as the slabs could also be installed so that they were offset transversely with respect to their peak lines.

First layer 25 and sixth layer 30 have hard, cold-insensitive layers on their exteriors and softer layers on their interiors that can easily be welded and face layers 26 and 29. The slabs in layers 26 and 29 have layers on both sides that can be readily welded. Layers 26 and 29 are joined with layers 25 and 30 along welding lines 33 that coincide with edge-shaped peak lines 14; layer 26 is connected with layer 27, layer 27 with layer 28, and layer 28 with layer 29, by spot welds 34 in each case, namely the intersections of the respective upper and lower peak lines 14 that intersect one another at 90°. The spot welds 34 in the example shown, with a total slab thickness of 21 mm, has a density of 9 spot welds per cm². The number of spot welds varies depending on the version of the slab.

In FIG. 4, in a portion of the slab shown, a foam filling 37 is indicated by the dotted shading. The foam density in this example is on the order of 20 kg/m³. The foam filling therefore increases the weight of the slab little if at all, but prevents water from penetrating and absorbs sound. These properties can be especially important in a floor topping installation to reduce the sound of footsteps, or in lost formwork. In addition, the foam joins any individual cold, i.e. defective, spot welds.

The composite slab 24 according to FIG. 4 has excellent properties as far as bending resistance, surface pressure loadability, and point pressure loadability, abrasion resistance, resistance to heat and cold, as well as ease of handling. It is low in weight, can be worked easily, i.e. sawn, drilled, and nailed, with a high modulus of elasticity, as well as a surface quality that can be varied depending on the application, namely smooth, rough, dull, patterned, and the like. Its preferred application is for formwork in concrete construction.

To produce composite slab 24, basic slabs 1 and shaped slabs 13 are initially produced in the manner described above and are given the required material properties, especially in outer layers 2 and 4. Then bottom outer layer 4 of the shaped slab of layer 26 and top outer layer 2 of the shaped slab in layer 27 are heated with long-wave infrared light for each connecting plane, for example the plane between layers 26 and 27, in such fashion that they are softened or melted, while middle layer 3 in each case retains its shape and stability. In addition, hot foaming polypropylene material is optionally applied to facing surfaces, so that additional heat is supplied and the welding temperature is maintained during the following transport steps. The two layers 26 and 27 are placed against one another in the correct position and passed through a press calender with a precisely adjusted nip width, joining them at their contact points which become spot welds 34.

For reasons of calender adjustment, it may be advantageous first to weld layers 28 and 29 together in the same fashion and then, following another calender adjustment, to weld double layer 26+27 and double layer 28+29 in the same fashion. Following another nip adjustment of the press calender, layers 25 and 30 are welded in the same fashion, sequentially or simultaneously, with the uppermost and lowermost peak lines 14 of the composite thus produced becoming welding lines 33. Before or during the respective welding processes, the plastic foam is added and fills the cavities. After cooling, the slab is complete. The individual layers can of course also be welded in a different sequence. The individual manufacturing method described is to be recommended for reasons of economy. From the technical standpoint, production in a single workstep is also possible.

Figure 5:
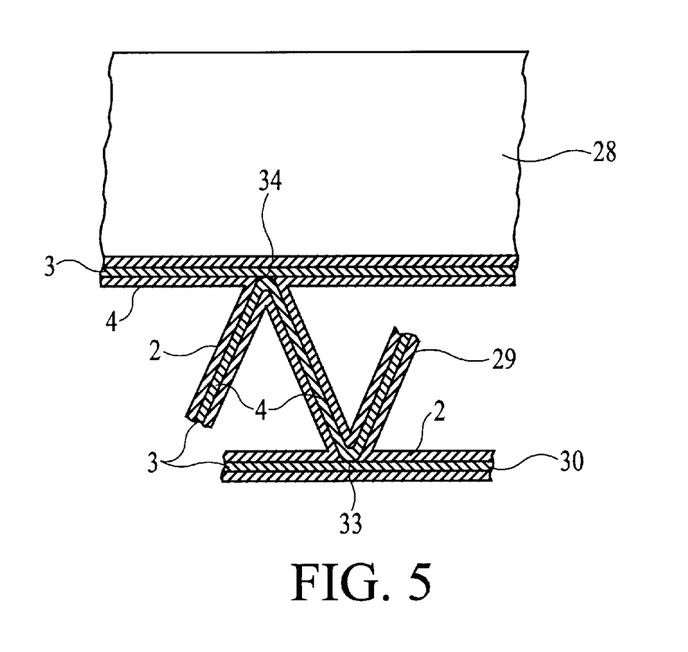
FIG. 5 is a section through an outer layer, a first inner layer, and a second inner layer of a multilayer composite slab, showing a connecting point and a connecting line.

The processes during welding will now be described in greater detail with reference to FIG. 5. The figure shows a section of a bottom portion of the slab, with parts of layers 28, 39, and 30. In the embodiment shown, middle layers 3 of layers 28 and 29 as well as of layers 29 and 30 are in contact with one another at spot welds 34 and/or welded line 33. The material of bottom outer layer 4 and/or top outer layer 2 of layers 28 and 29 and/or bottom outer layer 4 and top outer layer 2 of layers 29 and 30 is squeezed at the spot weld or welding line area between the middle layers 3. This contact causes the modulus of elasticity to increase considerably in the thickness direction. If a certain modulus of elasticity is desired, however, by a suitable adjustment of the nip of the press calender, material of outer layers 2 and 4 can remain between middle layers 3. At spot weld 34, the press calender exerts a surface pressure at the beginning of compression on the order of more than 10 N/mm², preferably up to 200 N/mm², which decreases again however, by 0.5 mm for example, during mutual penetration. The degree of compression depends on a variety of method parameters, namely the material, the viscosity as a function of heating, and the surface pressure, and/or on the pressure that depends on the area, compressive force, and the nature of the compression. Mutual penetration into respective adjacent outer layers 2 and 4 is facilitated by an acute angle in the peak area, which allows using a lower compressive force and hence a lighter calender. Relatively steep flanks 15 on the shaped slabs in layers 26 and 29 also increase the modulus of elasticity in the thickness direction, but also lead to a higher degree of volume filling and hence to a higher slab weight. Depending on the characteristics of the slabs that are required in individual cases, an optimum can be set in this case.

Figure 6:
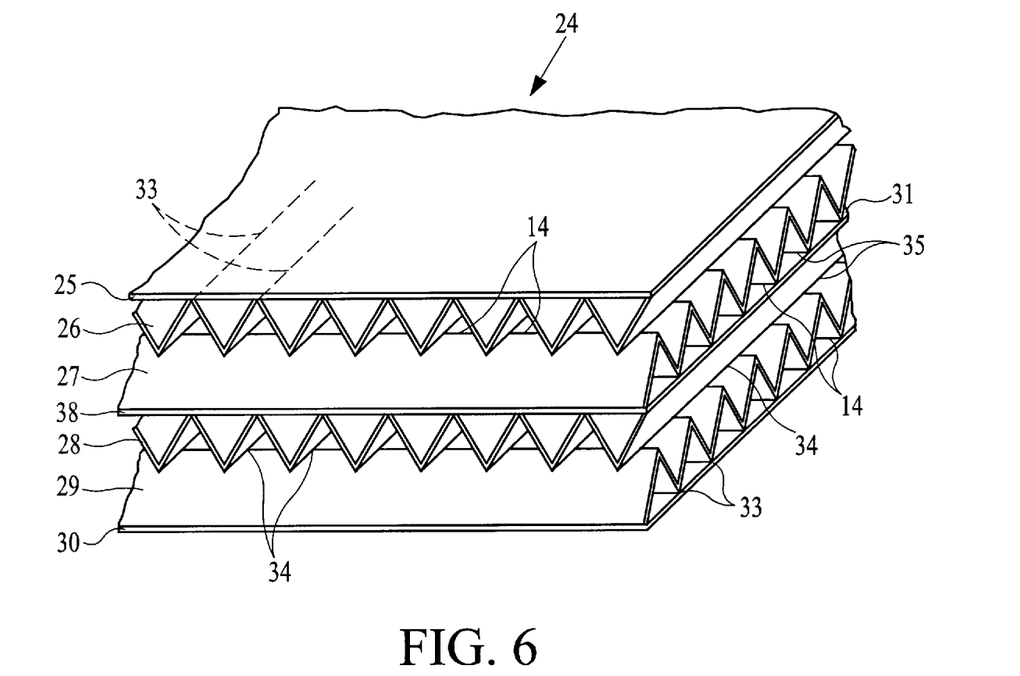
FIG. 6 is a perspective view of one corner of a seven-layer composite slab with a layer in the form of an intermediate slab in the center.

FIG. 6 shows plane composite slab 24 in a modified embodiment, namely with seven layers. Its seven layers, as shown in FIG. 4, initially consist of external first layer 25, second shaped layer 26, third shaped layer 27, fourth shaped layer 28, fifth shaped layer 29, and sixth layer 30; to this extent therefore the slab according to FIG. 6 resembles the one in FIG. 4. However, between layers 27 and 28 and connected with it by welded lines 35, it also contains a layer consisting of a plane intermediate slab 38 that is welded to shaped layers 27 and 28 abutting it along peak lines 14 that are in contact with intermediate slab 38. However, such intermediate slabs 38 can also be inserted between layers 26 and 27 as well as 28 and 29, and welding can also be limited for example to every second, third, etc. peak line 14 of the adjacent shaped slabs.

No foam filing is shown in the slab in FIG. 6.

The single intermediate slab 38 shown in the example in FIG. 6 influences the bending properties and tensile strength with thickness of composite slab 24, and proves to be significant for example when the peak lines are located a greater distance apart from one another, so that without an intermediate slab, only a low spot weld density would result or when only some of peak lines 14 are used as welding lines 35.

Figure 7:
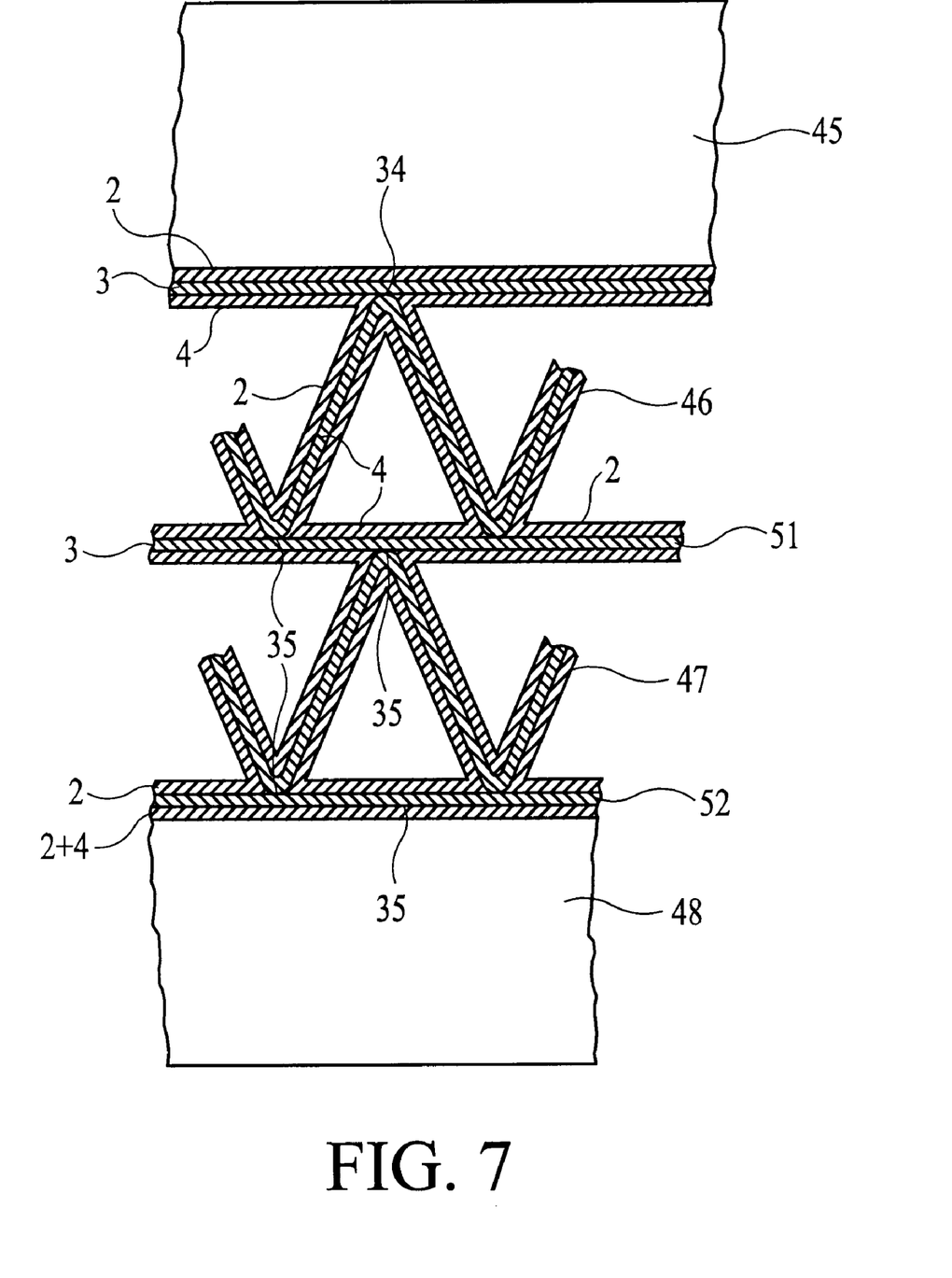
FIG. 7 is a section through a composite made of a plurality of shaped layers, partially with and partially without intermediate slabs located therebetween, showing a connecting point and a plurality of connecting lines.

FIG. 7 shows a portion of a slab in cross section, with portions of four shaped layers 45, 46, 47, and 48. There is an intermediate slab 51 between layers 46 and 47 and there is an intermediate slab 52 between layers 47 and 48.

In the drawing shown in FIG. 7, to illustrate the variety of possibilities, the relative orientations of layers 45 and 46 on the one hand and layers 47 and 48 on the other hand are shown rotated through 90°, while layers 46 and 47 are oriented parallel to one another on both sides of intermediate slab 51 and are in phase, so that welding lines 35 on intermediate slab 51 are offset by a quarter of a wave period. The significance of this offset consists in the possibility of influencing the flexibility of the composite slab in one bending direction. It should be noted in the view of intermediate slab 52 and layer 48 that bottom outer layer 4 of intermediate slab 52 and top outer layer 2 of layer 48 are melted together to form a common layer in the plane of the image. For this reason, the view resembles that between layers 45 and 46.

Figure 8:
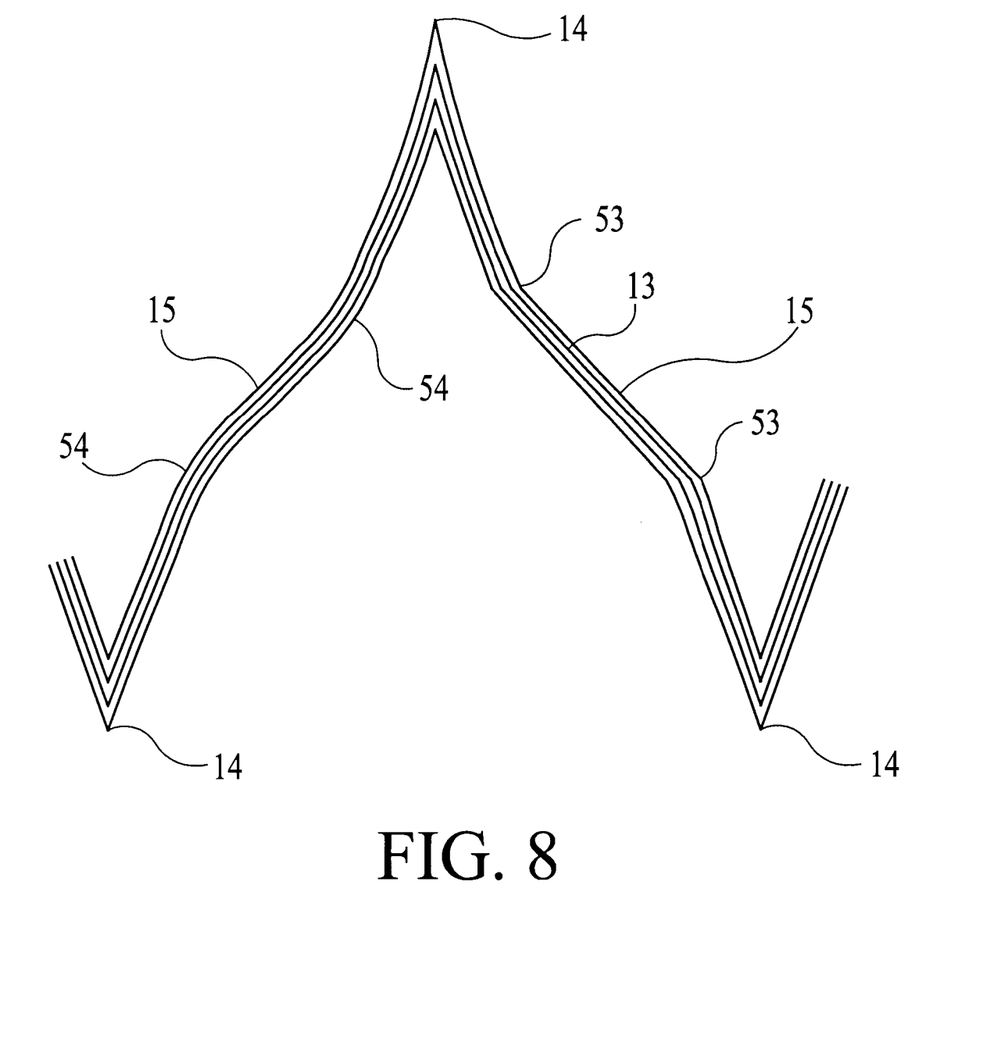
FIG. 8 is an end view of a section of a modified slab profile of one layer of a composite slab in two different designs.

FIG. 8 shows a corrugated shape of the shaped slabs in which the requirements for an acute angle in the vicinity of peak lines 14 and for a flatter flank angle to reduce the slab weight are fulfilled by additional bending lines 53 or (as shown at the left in the figure) curved areas 54 in flanks 15, combined.

Figure 9:
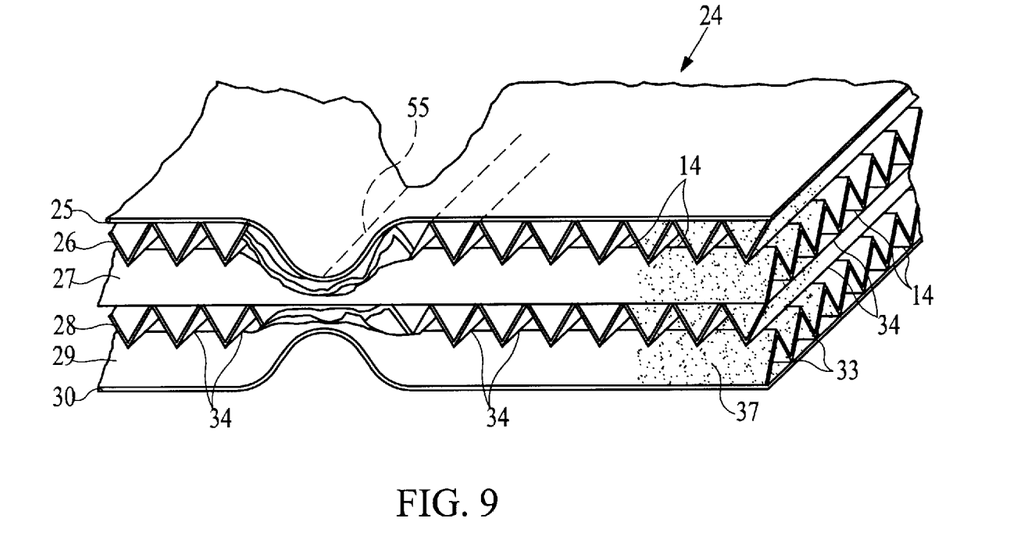
FIG. 9 is a perspective view of a portion of a six-layer composite slab that has a bending line.
Figure 10:
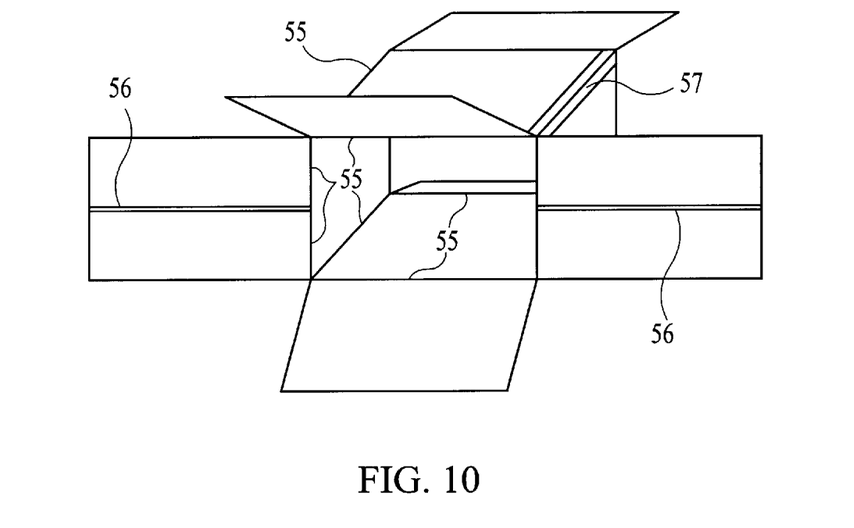
FIG. 10 is a perspective, schematic view of a folding carton made of the material shown in FIG. 9.

FIG. 9 shows a variation on the composite slab that differs from the composite slab shown in FIG. 4 by the presence of a bending line 55 that has the property of a hinge. Bending line 55 is formed by thermoforming, with line punches, heated above the softening point of the plastic used, penetrate from above and below, and possibly also from one side only, into the composite slab and approach one another to within 0.5 mm for example, so that at this point, the profile structures are melted down and the thickness of the slabs forming the layers is possibly reduced as well. In the case of polypropylene for example, a fold number of up to 2000 can be reached. If certain of the linear punches approach one another to within zero distance, at this point the composite slab is cut through and a cut line 56 results (FIG. 10). By means of a suitable grid of such linear punches projecting to a greater or lesser degree in different areas, a bending and cutting line pattern can be embossed in the composite slab that makes it possible to fold the composite slab as a packing unit, for example a cardboard box or a carton. FIG. 10 shows an example of such a carton, in which, a bending hinge strip 57 made of flexible, i.e. readily foldable material is glued or welded along one edge to produce a hinge line at this point. If such connections are intended to be releasable, they can be produced for example by button-type connectors such as knobs and recesses.

FIG. 9 shows a flexible relatively strong material as the material for the carton, said material having four shaped layers. By reducing the number of shaped layers, a lighter, more flexible material can be created that is especially suitable for smaller boxes. By comparison to boxes made of cardboard or corrugated cardboard, cartons and boxes made from the composite slab according to the invention are much more sturdy, insensitive to water, and resistant to penetration.

Figure 11:
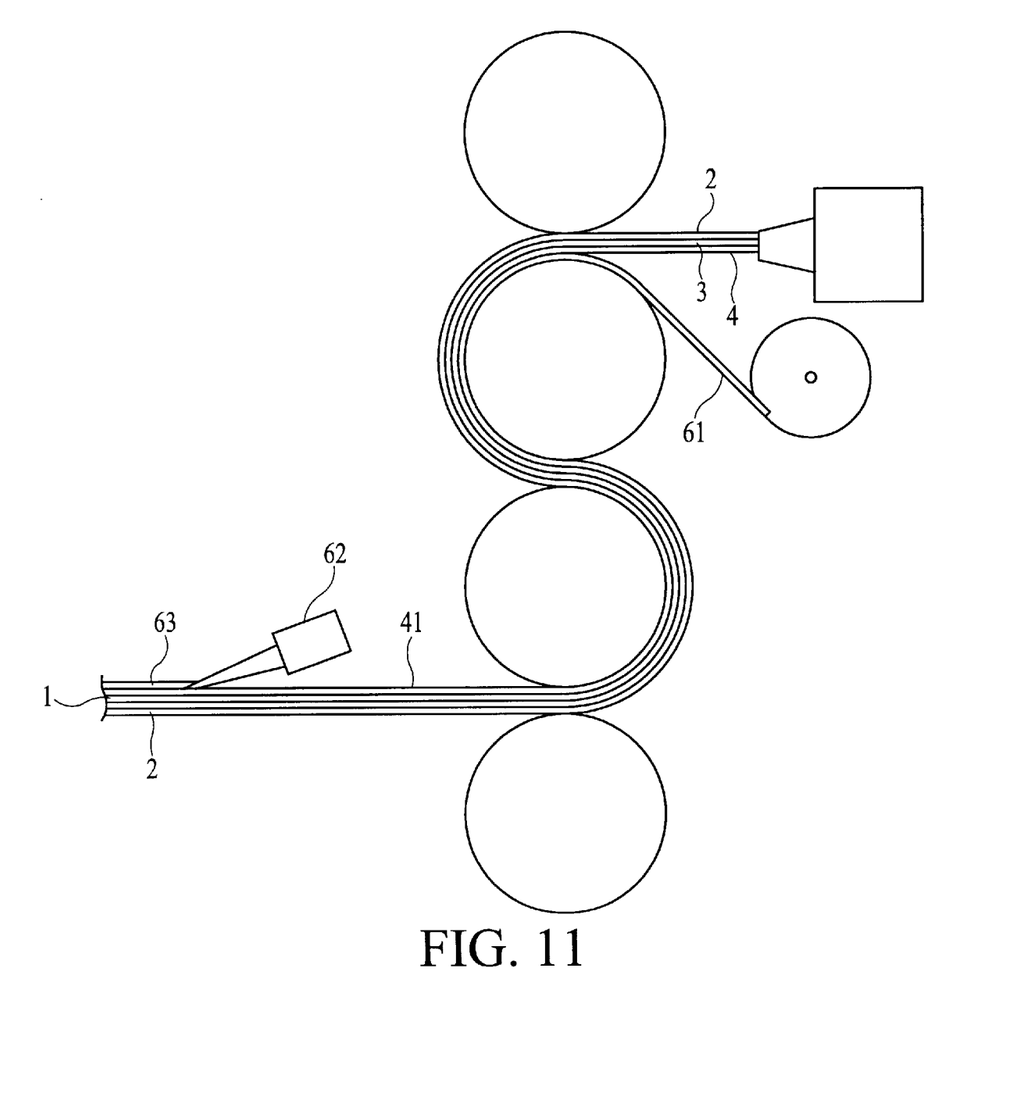
FIG. 11 is a side view of a modified composite slab for use as a single slab or as an outer layer, indicating an installation for its manufacture.

Slab 24 can be subjected on its outer surfaces to further special treatments when there are special requirements. While smooth but nailable surfaces are required for formwork that is to be reused, depending on the customer's wishes, the surface can also be given a structure or a pattern, for example by passing basic slab 1 through an embossing calender while still warm. FIG. 11 also shows the possibility of applying a glass fiber fabric 61 initially to outer layer 2 of the basic slab, said fabric being joined by passing through a calender arrangement, while outer layer 2 is still soft from being extruded, and then, by means of an extruder 62, applying a smooth plastic layer 63. A version of basic slab 1 supplemented in this manner is then usable only for outer layers 25 and 30 but not for making shaped slabs 13.

We claim:

1. Composite slab made of plastic for construction purposes, with a composite comprising two outer layers and a middle layer made of polymers from the same material group, characterized in that the composite is a composite extruded in multiple layers, the middle layer of said composite consisting of a highly crystalline polymer with incorporated stretch-resistant fibers whose melting point is at least 15° C. higher than the melting points of the polymers in the outer layers and whose modulus of elasticity is at least 10% lower than the moduli of elasticity of the polymers of the outer layers.

2. Composite slab according to claim 1, characterized in that the polymers are polyolefins.

3. Composite slab according to claim 1, characterized in that the stretch-resistant fibers in the polymer of the middle layer are chemically coupled fibers selected from the group consisting of steel, glass, and carbon fiber.

4. Composite slab according to claim 1, characterized in that it comprises at least two layers, each of which consists of the multilayered extruded composite, with one being a plane layer and the other a profiled layer which has a corrugated profile with peak lines located in a plane, and in that these layers are welded together along the peak lines on one side of the profiled layer.

5. Composite slab according to claim 4, characterized in that the corrugated profile is a zigzag profile and the peak lines are edges parallel to one another, between which flanks are located.

6. Composite slab according to claim 5, characterized in that the profiled layer has a degree of volume filling equal to 30% to 60% and the outsides of the flanks of the corrugated profile converge at a slope angle between 30° and 60° at peak line (14).

7. Composite slab according to claim 4, characterized in that it comprises a plurality of profiled layers that are welded together, with each of these layers having peak lines parallel to one another and the peak lines of adjacent shaped layers assuming an angle with respect to one another of more than 20°.

8. Composite slab according to claim 7, characterized in that an intermediate panel is inserted between at least two adjacent profiled layers, said intermediate slab being welded to the peak lines of the adjacent profiled layers and likewise consisting of the multilayer extruded composite.

9. Composite slab according to claim 4, characterized in that at least one bending line runs across the composite slab, in which the layers are locally melted down to form a bending hinge.

10. Composite slab according to claim 9, characterized in that cutouts with edges are formed in the slab and connecting means that are releasable along at least a portion of the cutout edges are formed to connect cutout edges that are adjacent to one another, and in that edge portions of the composite slabs are connected together by glued or welded bending hinge strips, with the pattern of the bending lines and cutouts producing a cardboard blank.

11. Composite slab according to claim 4, characterized in that the corrugated profile of the profile layer comprises wave troughs between the peak lines on both sides thereof, which wave troughs are filled with foam.

12. Method for producing a composite slab according to claim 4, characterized in that the material of the layers is produced in the form of slabs by multilayer extrusion and the profiled layers are produced from a portion of this material by deep drawing, with drawing being performed at a temperature at which an oriented structure is produced in the middle layer, but which is however below the melting point, and the layers are then raised to a temperature that is between the melting points of the middle layer and the outer layers of the layers, and they are placed on top of one another and pressed against one another for welding in this heated state, with contact at edges and points.

13. Method according to claim 12 for producing a composite slab from more than two layers, characterized in that the layers are connected together in a plurality of welding steps in which connections are produced only in a single connecting plane between two layers.

14. Method according to claim 12, characterized in that the slab sides to be welded linewise or pointwise are heated immediately before welding and coated with a foaming material that is applied when hot.

15. Method according to claim 12, characterized in that the slabs just extruded are allowed to cool to produce the profiled layers, then heated to a temperature that breaks up the crystalline superlattices, then they are cooled to a temperature suitable for drawing and then shaped by deep drawing.

16. Composite slab according to claim 7, characterized in that the peak lines of adjacent shaped layers assume an angle with respect to one another of 90°.

* * * * *